(12) United States Patent
Yuan et al.

(10) Patent No.: US 8,374,350 B2
(45) Date of Patent: Feb. 12, 2013

(54) QUANTUM COMMUNICATION SYSTEM

(75) Inventors: Zhiliang Yuan, Cambridge (GB);
Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1042 days.

(21) Appl. No.: 11/530,349

(22) Filed: Sep. 8, 2006

(65) Prior Publication Data

US 2010/0027794 A1    Feb. 4, 2010

(30) Foreign Application Priority Data

Sep. 9, 2005  (GB) .................................. 0518469.2

(51) Int. Cl.
*H04K 1/00* (2006.01)
*H04L 9/08* (2006.01)

(52) U.S. Cl. .......... 380/255; 380/31; 380/256; 380/277; 380/278; 375/144; 375/145; 375/149; 375/329; 375/353; 375/355

(58) Field of Classification Search ............ 380/31, 380/44, 252, 255, 256, 278; 375/148, 353; 713/150, 168; 398/202
See application file for complete search history.

(56) References Cited

U.S. PATENT DOCUMENTS

| | | | | |
|---|---|---|---|---|
| 5,515,438 A * | 5/1996 | Bennett et al. | ................. | 380/278 |
| 5,764,765 A * | 6/1998 | Phoenix et al. | ................. | 380/283 |
| 5,953,420 A * | 9/1999 | Matyas et al. | ................. | 713/171 |
| 5,953,421 A * | 9/1999 | Townsend | ................. | 380/283 |
| 6,438,234 B1 * | 8/2002 | Gisin et al. | ................. | 380/256 |
| 6,678,379 B1 * | 1/2004 | Mayers et al. | ................. | 380/278 |
| 6,686,879 B2 * | 2/2004 | Shattil | ................. | 342/367 |
| 6,778,669 B1 * | 8/2004 | Lehureau | ................. | 380/256 |
| 6,895,092 B2 * | 5/2005 | Tomita | ................. | 380/278 |
| 7,145,128 B2 * | 12/2006 | Tanaka | ................. | 250/231.13 |
| 7,295,597 B2 * | 11/2007 | Fitton et al. | ................. | 375/148 |
| 7,298,848 B2 * | 11/2007 | Debuisschert | ................. | 380/256 |
| 7,333,611 B1 * | 2/2008 | Yuen et al. | ................. | 380/256 |
| 7,359,513 B2 * | 4/2008 | Gisin et al. | ................. | 380/256 |
| 7,460,669 B2 * | 12/2008 | Foden et al. | ................. | 380/256 |
| 7,697,687 B2 * | 4/2010 | Liang et al. | ................. | 380/255 |
| 2001/0055389 A1 * | 12/2001 | Hughes et al. | ................. | 380/44 |
| 2002/0097874 A1 * | 7/2002 | Foden et al. | ................. | 380/256 |
| 2003/0169880 A1 * | 9/2003 | Nambu et al. | ................. | 380/256 |

(Continued)

FOREIGN PATENT DOCUMENTS

GB    2 368 502 A    5/2002

OTHER PUBLICATIONS

Eric corndorf et al, High-speed data encryption over 25 km of fiber by two-mode coherent-state quantum cryptography, pp. 2040-2042, Optical Society of America, 2003.*

(Continued)

*Primary Examiner* — Philip Chea
*Assistant Examiner* — Shanto M Abedin
(74) *Attorney, Agent, or Firm* — Oblon, Spivak, McClelland, Maier & Neustadt, L.L.P.

(57) ABSTRACT

A system for transmitting quantum information includes a sending unit including an encoder configured to encode a carrier with quantum information by setting a quantum state of the carrier, the quantum state determined according to the combination of a first component and a second component, and a receiving unit including a decoder configured to perform a measurement on the carrier using a measurement basis selected to cancel the second component and decode the quantum information from the carrier.

19 Claims, 11 Drawing Sheets

U.S. PATENT DOCUMENTS

| | | | |
|---|---|---|---|
| 2004/0047402 A1* | 3/2004 | Hui et al. | 375/148 |
| 2004/0057526 A1 | 3/2004 | Debuisschert | |
| 2005/0036624 A1* | 2/2005 | Kent et al. | 380/277 |
| 2005/0047601 A1* | 3/2005 | Shields et al. | 380/283 |
| 2005/0094818 A1* | 5/2005 | Inoue et al. | 380/278 |
| 2005/0100351 A1* | 5/2005 | Yuan et al. | 398/214 |
| 2005/0135620 A1* | 6/2005 | Kastella et al. | 380/256 |
| 2005/0141716 A1* | 6/2005 | Kumar et al. | 380/255 |
| 2006/0088157 A1* | 4/2006 | Fujii | 380/30 |
| 2006/0120529 A1* | 6/2006 | Gisin et al. | 380/256 |
| 2007/0065155 A1* | 3/2007 | Luo et al. | 398/141 |
| 2007/0116286 A1* | 5/2007 | Yuan et al. | 380/256 |
| 2007/0140495 A1* | 6/2007 | Berzanskis et al. | 380/278 |
| 2007/0223698 A1* | 9/2007 | Tsurumaru | 380/256 |
| 2008/0031637 A1* | 2/2008 | Tomaru | 398/188 |
| 2009/0175450 A1* | 7/2009 | Brandt | 380/277 |

OTHER PUBLICATIONS

Charles H. Bennett, et al., "Quantum Cryptography: Public Key Distribution and Coin Tossing" International Conference on Computers, Systems & Signal Processing, Dec. 10-12, 1984, pp. 175-179.

Charles H. Bennett, "Quantum Cryptography Using Any Two Nonorthogonal States" Physical Review Letters, vol. 68, No. 21, May 25, 1992, pp. 3121-3124.

* cited by examiner

| Alice PM | | Bob PM | | Detector A | Detector B | Agreed Bit Value |
|---|---|---|---|---|---|---|
| Encoding | Authentication | Encoding | Authentication | | | |
| Basis I | 0° | Δφ | 0° | Δφ | 100% | 0% | 0 |
| | | | 90° | Δφ | 50% | 50% | n/a |
| | 180° | Δφ | 0° | Δφ | 0% | 100% | 1 |
| | | | 90° | Δφ | 50% | 50% | n/a |
| Basis II | 90° | Δφ | 0° | Δφ | 50% | 50% | n/a |
| | | | 90° | Δφ | 100% | 0% | 0 |
| | 270° | Δφ | 0° | Δφ | 50% | 50% | n/a |
| | | | 90° | Δφ | 0% | 100% | 1 |

$\Delta\phi = \Delta\phi_1, \Delta\phi_2, \ldots \Delta\phi_n, (n \geq 2)$

Figure 3

| Alice PM | | Bob PM | | Detector A | Agreed Bit Value |
|---|---|---|---|---|---|
| Encoding | Authentication | Encoding | Authentication | | |
| 0° | $\Delta\phi$ | 180° | $\Delta\phi$ | 0% | n/a |
| | | 270° | $\Delta\phi$ | 50% | 0 |
| 90° | $\Delta\phi$ | 180° | $\Delta\phi$ | 50% | 1 |
| | | 270° | $\Delta\phi$ | 0% | n/a |

$\Delta\phi = \Delta\phi_1, \Delta\phi_2, \ldots \Delta\phi_n, (n \geq 2)$

Figure 4

| 100% Alice PM | | Bob PM | | Detector A | Detector B | Agreed Bit Value |
|---|---|---|---|---|---|---|
| Encoding | Authentication | Encoding | Authentication | | | |
| 0° | Δφ | 0° | Δφ | 100% | 0% | 0 |
|  |  | 60° | Δφ | 50% | 50% | n/a |
|  |  | 120° | Δφ | 50% | 50% | n/a |
| 180° | Δφ | 0° | Δφ | 0% | 100% | 1 |
|  |  | 60° | Δφ | 50% | 50% | n/a |
|  |  | 120° | Δφ | 50% | 50% | n/a |
| 60° | Δφ | 0° | Δφ | 50% | 50% | n/a |
|  |  | 60° | Δφ | 100% | 0% | 0 |
|  |  | 120° | Δφ | 50% | 50% | n/a |
| 240° | Δφ | 0° | Δφ | 50% | 50% | n/a |
|  |  | 60° | Δφ | 0% | 100% | 1 |
|  |  | 120° | Δφ | 50% | 50% | n/a |
| 120° | Δφ | 0° | Δφ | 50% | 50% | n/a |
|  |  | 60° | Δφ | 50% | 50% | n/a |
|  |  | 120° | Δφ | 100% | 0% | 0 |
| 300° | Δφ | 0° | Δφ | 50% | 50% | n/a |
|  |  | 60° | Δφ | 50% | 50% | n/a |
|  |  | 120° | Δφ | 0% | 100% | 1 |

$\Delta\phi = \Delta\phi_1, \Delta\phi_2, \ldots \Delta\phi_n, (n \geq 2)$; Encoding/Sifting Bases: $\{0°, 180°\}$, $\{60°, 240°\}$, and $\{120°, 300°\}$

Figure 5

| Alice Polarisation Rotator | | Bob Polarisation Rotator | | Detector A | Detector B | Agreed Bit Value |
|---|---|---|---|---|---|---|
| Encoding | Authentication | Encoding | Authentication | | | |
| 0° | Δφ | 0° | Δφ | 100% | 0% | 0 |
| | | 45° | Δφ | 50% | 50% | n/a |
| 90° | Δφ | 0° | Δφ | 0% | 100% | 1 |
| | | 45° | Δφ | 50% | 50% | n/a |
| 45° | Δφ | 0° | Δφ | 50% | 50% | n/a |
| | | 45° | Δφ | 100% | 0% | 0 |
| 135° | Δφ | 0° | Δφ | 50% | 50% | n/a |
| | | 45° | Δφ | 0% | 100% | 1 |

$\Delta\phi = \Delta\phi_1, \Delta\phi_2, \ldots \Delta\phi_n$, ($n \geq 2$); Encoding/Sifting bases: $\{0°, 90°\}$ and $\{45°, 135°\}$

Figure 7

| Alice Phase Modulation | | Bob Phase Modulation | | | | | Detector A | Detector B | Agreed Bit Value |
|---|---|---|---|---|---|---|---|---|---|
| Encoding | Authentication | Basis | Inversion | Encoding | Authentication | | | | |
| Basis I | 0° | Δφ | I | No | 0° | Δφ | 100% | 0% | 0 |
| | | | II | No | 90° | Δφ | 50% | 50% | n/a |
| | | | I | Yes | 180° | Δφ | 0% | 100% | 0 |
| | | | II | Yes | 270° | Δφ | 50% | 50% | n/a |
| | 180° | Δφ | I | No | 0° | Δφ | 0% | 100% | 1 |
| | | | II | No | 90° | Δφ | 50% | 50% | n/a |
| | | | I | Yes | 180° | Δφ | 100% | 0% | 1 |
| | | | II | Yes | 270° | Δφ | 50% | 50% | n/a |
| Basis II | 90° | Δφ | I | No | 0° | Δφ | 50% | 50% | n/a |
| | | | II | No | 90° | Δφ | 0% | 100% | 0 |
| | | | I | Yes | 180° | Δφ | 50% | 50% | n/a |
| | | | II | Yes | 270° | Δφ | 100% | 0% | 0 |
| | 270° | Δφ | I | No | 0° | Δφ | 50% | 50% | n/a |
| | | | II | No | 90° | Δφ | 100% | 0% | 1 |
| | | | I | Yes | 180° | Δφ | 50% | 50% | n/a |
| | | | II | Yes | 270° | Δφ | 0% | 100% | 1 |

$\Delta\phi = \Delta\phi_1, \Delta\phi_2, \ldots \Delta\phi_n, (n \geq 2)$

Figure 10

| Alice Encoding | | | Bob | | Detector A | Detector B | Agreed Bit |
|---|---|---|---|---|---|---|---|
| | | | Random Component | Authentication Component | | | |
| Sifting basis III | 0° (bit 0) | Δφ | 0° | Δφ | 100% | 0% | n/a |
| | | Δφ | 90° | Δφ | 50% | 50% | Bit 0 if Detector B clicks |
| | | Δφ | 180° | Δφ | 0% | 100% | n/a |
| | | Δφ | 270° | Δφ | 50% | 50% | Bit 0 if Detector A clicks |
| | 270° (bit 1) | Δφ | 0° | Δφ | 50% | 50% | Bit 1 if Detector B clicks |
| | | Δφ | 90° | Δφ | 0% | 100% | n/a |
| | | Δφ | 180° | Δφ | 50% | 50% | Bit 1 if Detector A clicks |
| | | Δφ | 270° | Δφ | 100% | 0% | n/a |
| Sifting basis IV | 90°(bit 0) | Δφ | 0° | Δφ | 50% | 50% | Bit 0 if Detector A clicks |
| | | Δφ | 90° | Δφ | 100% | 0% | n/a |
| | | Δφ | 180° | Δφ | 50% | 50% | Bit 0 if Detector B Clicks |
| | | Δφ | 270° | Δφ | 100% | 0% | n/a |
| | 180°(bit 1) | Δφ | 0° | Δφ | 0% | 100% | n/a |
| | | Δφ | 90° | Δφ | 50% | 50% | Bit 1 if Detector B Clicks |
| | | Δφ | 180° | Δφ | 100% | 0% | n/a |
| | | Δφ | 270° | Δφ | 50% | 50% | Bit 1 if Detector A Clicks |

$\Delta\phi = \Delta\phi_1, \Delta\phi_2, \ldots \Delta\phi_n, (n \geq 2)$

Figure 11

QUANTUM COMMUNICATION SYSTEM

FIELD OF THE INVENTION

The present invention relates to the field of quantum communication systems. More specifically, the present invention relates to encoders for a quantum communication systems and encoding method for quantum communication systems.

DESCRIPTION OF BACKGROUND

There is often a need to communicate a message in secret over a channel which can potentially be intercepted by an eavesdropper. Traditionally, such a problem has been addressed by encrypting or enciphering the message using a secret key. Quantum communication provides a secure method for distributing such a key. The sender (Alice) encodes bit information using randomly one of at least two non-orthogonal encoding basis upon single photons, where each photon carries 1 bit of information encoded as quantum state of the photon e.g. polarisation, phase or energy/time of the photon. The receiver (Bob) measures the encoded photons using a measurement basis randomly chosen from at least two bases for each photon. The measurement recovers the correct encoded bit if Bob has chosen a compatible measurement basis. Alice and Bob can post-select Bob's measurement results to sift a shared key bit sequence through classical communication.

Two common protocols for distributing a secret key using single photons or weak coherent pulses are known as BB84 (Bennett et al. Proceedings of the IEEE International Conference on Computers, Systems and Signal Processing, Bangalore, India (IEEE, New York 1984) p 175) and B92 (Bennett, Phys Rev. Lett, 68 3121 (1992)).

Quantum communication, or quantum key distribution, provides a solution for distributing keys between two remote parties. For the keys to be distributed securely it is essential that the users can authenticate one another. This allows Alice to be sure she is communicating with Bob and Bob to be sure he is communicating with Alice.

There exists a potentially risky security loophole in the conventional quantum communication system. An eavesdropper (Eve) can launch the so-called "man-in-the-middle attack" and gain full information without detection. In this attack, she severs the communication link between Alice and Bob, then impersonates Alice to Bob, and Bob to Alice. She exchanges keys with Alice and Bob separately, and therefore obtain two independent copies of keys—one perfectly shared with Alice and one perfectly shared with Bob. Subsequently, any communications encrypted by these keys are readable to Eve.

To address such "man-in-the-middle attack", user "authentication" can be used. It is often assumed that a private quantum channel is inherently authentic and needs no further authentication. If authentication is performed, it is usually performed between two parties by authenticating classical communication using classical cryptography. Alice and Bob pre-shared a secret key prior to quantum communication, and use this secret key to authenticate each classical communication message with each other. Alice and Bob can either encrypt all of their classical communications or using classical hash functions to hash the classical communication message to form a message digest which is used for identifying the origin of message. The former method may cost too much in terms of key materials, and is not practical. The latter method of using hashing, which costs less in terms of key materials than encryption, is widely used in quantum communication systems.

However, there is a disadvantage of authenticating classical messages. Classical authentication does not allow re-use of the authentication key, and the authentication key must be refreshed for every classical message. This will make authentication management very complex, and authentication may cost too much in terms of key materials.

In quantum communication systems, the photon pulses are either generated using a so-called single photon source which is configured to output pulses containing one photon in response to electrical or optical stimulation or they are generated by attenuating pulses from a conventional pulsed laser. There exists a security risk in quantum communication systems using attenuated laser pulses as the carriers for the quantum information since multiphoton pulses are inevitably produced even by very strongly attenuated lasers. The distribution in the number of photons per pulse for an attenuated laser with average of $\mu$ photons per pulse obeys Poissonian statistics:

$$P(n)=\mu^n e^{-n}/n!,$$

where P(n) represents probability of a pulse containing n photons. There is a finite probability of a pulse containing more than one photon. Pulses containing more than one photon are called multiphoton pulses. Eve can launch a pulse-number splitting attack upon these multiphoton pulses. For each multiphoton pulse, she splits one photon from the pulse and stores it, and passes the remainder of the pulse to Bob. She can measure precisely the stored photon after Bob's announcement of the measurement basis. In this way, she gains the full information of the state encoded upon the multiphoton pulse without causing errors in Alice and Bob's shared key. Generally, the photon-number splitting attack either completely destroys the security of a quantum key distribution system or strongly reduces its maximum bit rate or range.

SUMMARY OF INVENTION

The present invention attempts to address these problems and in a first aspect provides a system for transmitting quantum information comprising a sending unit and a receiving unit, said sending unit comprising an encoder configured to encode a carrier with quantum information by setting a quantum state of the carrier, the quantum state determined according to a first component and a second component, the receiving unit comprising a decoder configured to cancel said second component and decode said quantum information from the carrier.

Thus, essentially Alice and Bob conceal from Eve the range of state representations which they will use for each carrier. This is achieved by Alice and Bob applying an additional component, generally in the form of an extra polarisation rotation or phase shift, to each quantum information carrier on the basis of secret information which they share. This additional rotation or phase shift can be thought of as an authentication component which allows quantum authentication between two communicating parties. Such quantum authentication rules out the man-in-the-middle attack completely, since without knowledge of Alice and Bob's pre-shared secret, Eve will be unable to form a shared key with either. The authentication component $\Delta\phi$ provides an intrinsically "always-on" authentication between Alice and Bob.

Without applying the correct phase shift or polarisation rotation Δφ for each pulse, Eve will cause too many errors in keys formed between her and Alice or Bob. Impersonation can be immediately identified.

It also prevents Eve's pulse-number splitting attack. As described earlier, this attack allows Eve to have full information from multi-photon pulses in a conventional quantum communication system. After application of an authentication component by Alice, a photon stored by Eve cannot be used to perform a deterministic measurement due to the fact that she does not possess the authentication component Δφ for this split photon pulse even after Bob announces the measurement basis that he used.

Thus, in a preferred embodiment, the first component conveys quantum bit information using an encoding basis or set which is selected from at least two incompatible encoding bases or sets, the second component conveys an additional authentication encoding.

The authentication component Δφ prevents the pulse-splitting attack. As described earlier, this attack allows Eve to have full information from multi-photon pulses in a conventional quantum communication system. After application of an authentication component Δφ by Alice, a photon stored by Eve cannot be used to perform a deterministic measurement due to the fact that she does not possess the authentication component Δφ for this split photon pulse.

Eve cannot determine the pre-shared secret random number (authentication key), from which the authentication component Δφ is derived. This is because she cannot measure the encoded quantum state precisely for each pulse because the pulse is at single photon level (typically μ=0.1 . . . 1). Also, random encoding component on top of the authentication component makes it more difficult for Eve to find out the authentication component. As a result the secret random number (authentication key) shared by Alice and Bob does not need to be frequently refreshed, and even may be re-used. This substantially reduces the authentication key material cost as compared with classical authentication which does not allow re-use of the authentication key.

Preferably, the encoder is configured to change the second component between successive carriers. The second component may be selected from a fixed set of n values e.g. polarisation rotations or phase shifts, where n is an integer greater than 1.

In a preferred embodiment, the encoder and decoder are provided with means to share or derive secret information concerning the second component. More preferably, both the encoder and decoder are configured to determine the second component from expansion of a shared secret seed key.

The encoder and decoder may be a phase encoder and phase decoder and wherein the second component is an additional phase shift or the encoder and decoder may be a polarisation encoder and polarisation decoder and the second component is an additional rotation of the polarisation.

The encoder is preferably configured to select the first component from a fixed set of N states, where N ($\geq$2) is an integer and more preferably the first component is selected in accordance with the BB84 or B92 protocol.

The carriers may be single photons or weak coherent photon pulses.

The system may be fibre optics based or free-space based.

In a second aspect, the present invention provides a decoder for a quantum communication system, configured to decode quantum information from a carrier when the quantum information is held in a quantum state of a carrier and the quantum state is set using a first and a second component, the decoder comprising means to determine information about the second component from a source other than the carrier and means to cancel the second component before determining said quantum information from the carrier.

In a third aspect, the present invention provides a quantum communication method comprising:

in a sending unit, encoding a carrier with quantum information by setting a quantum state of the carrier, said quantum state being set using a first component and a second component, sending the encoded carrier to a receiving unit comprising a decoder;

cancelling the second component from the carrier by the decoder, decoding the said first component of said quantum information.

In a preferred embodiment, secret information is shared between the sending unit and receiving unit concerning the second component. For example, the secret information may be a seed key and both the sending unit and the receiving unit expand the seed key.

Also, in accordance with the various quantum communication protocol, e.g. BB84, B92 etc, the receiving unit may communicate with the sending unit to disclose what types of measurements were performed on the photons by the receiving unit and specifically what types of measurement bases were used.

In a fourth aspect, the present invention provides a method of sending information to a receiving unit, the method comprising:

in a sending unit, encoding a carrier with quantum information by setting a quantum state of the carrier, said quantum state being set using a first component and a second component, the first component being chosen randomly and the second component being determined from information which will be shared with the receiving unit using another communication route than said encoded carrier.

In a fifth aspect, the present invention provides a method of receiving information from a sending unit, the method comprising:

in a receiving unit, receiving a carrier which has been encoded with quantum information, said quantum information being encoded by setting a quantum state of the carrier, said quantum state being set using a first component and a second component; and decoding said carrier by first determining said second component from a source other than said carrier and then cancelling said second component from said carrier and measuring said carrier to determine said first component using a measurement basis randomly chosen from n measurement basis where n is an integer of at least 2.

BRIEF DESCRIPTION OF DRAWINGS

The present invention will now be described with reference to the following non-limiting embodiments in which:

FIG. 3 is a table illustrating an encoding method in accordance with the present invention based on the BB84 protocol;

FIG. 4 is a table illustrating an encoding method in accordance with the present invention based on the B92 protocol;

FIG. 5 is a table illustrating an encoding method in accordance with the present invention based on a protocol using multiple bases;

FIG. 7 is a table illustrating an encoding method in accordance with the present invention using polarisation encoding based on the known BB84 protocol;

FIG. 10 is a table illustrating an encoding method with detection inversion in accordance with a further embodiment of the present invention.

FIG. 11 is a table illustrating an encoding method with detection inversion and non-deterministic encoding sets in accordance with a further embodiment of the present invention.

DETAILED DESCRIPTION

Figure 1:
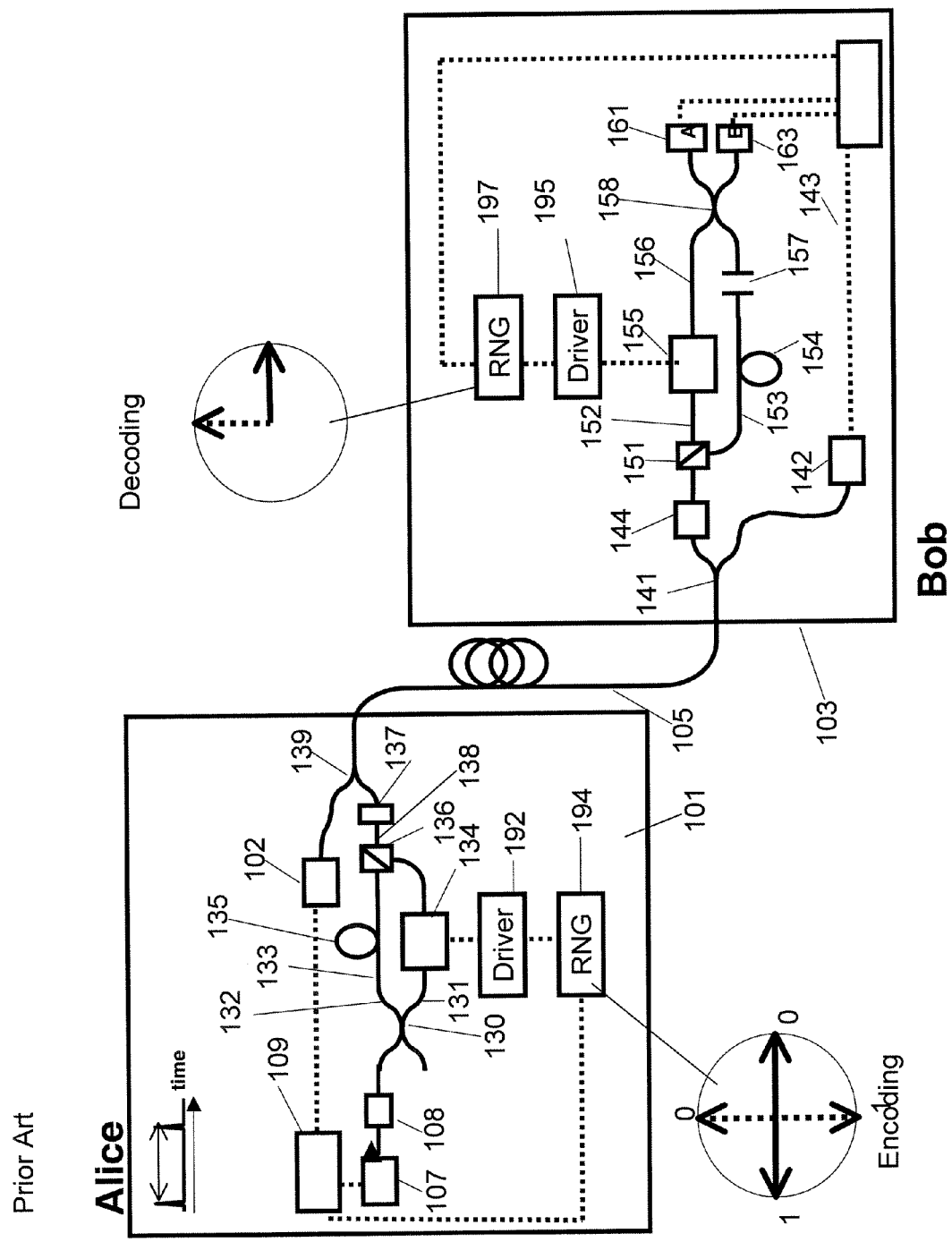
FIG. 1 shows a prior art quantum cryptography system based upon phase encoding using a polarisation sensitive fibre interferometer.

FIG. 1 shows a prior art quantum cryptography system based upon phase encoding using a polarisation sensitive fibre interferometer.

The sender "Alice" 101 sends encoded photons to receiver "Bob" 103 over optical fibre 105.

Alice's equipment 101 comprises a signal laser diode 107, a polarisation rotator 108 configured to rotate the polarisation of pulses from signal laser diode 107, an imbalanced fibre Mach-Zender interferometer 133 connected to the output of polarisation rotator 108, an attenuator 137 connected to the output of the interferometer 133, a bright clock laser 102, a wavelength division multiplexing (WDM) coupler 139 coupling the output from attenuator 137 and clock laser 102 and bias electronics 109 connected to said signal laser diode 107 and clock laser 102.

The interferometer 133 comprises an entrance coupler 130, one exit arm of entrance coupler 130 is joined to long arm 132, long arm 132 comprises a loop of fibre 135 designed to cause an optical delay, the other exit arm of entrance coupler 130 is joined to a short arm 131, short arm 131 comprises phase modulator 134. The interferometer also comprises an exit polarising beam combiner 136 which is connected to the other ends of long arm 132 and short arm 131. All components used in Alice's interferometer 133 are polarisation maintaining.

Alice's equipment also comprises a phase modulator driver 192 connected to phase modulator 134, and a random number generator 194 connected to phase modulator driver 192.

During each clock signal, the signal diode laser 107 outputs one optical pulse. The signal diode laser 107 is connected to biasing electronics 109 which instruct the signal diode laser 107 to output the optical pulse. The biasing electronics are also connected to clock laser 102.

The linear polarisation of the signal pulses outputted by diode laser 107 is rotated by a polarisation rotator 108 so that the polarisation of the pulse is aligned to be parallel to a particular axis of the polarisation maintaining fibre (usually the slow axis) of the entrance coupler 130 of the interferometer 133. Alternatively the polarisation rotator 108 may be omitted by rotating the signal laser diode 107 with respect to the axes of the entrance polarisation maintaining fibre coupler 130. Alternatively the polarisation rotator 108 may be replaced by a polarisation filter, which is aligned in such a way that the polarisation of the filtered pulse is aligned to be parallel to a particular axis of the polarisation maintaining fibre (usually the slow axis) of the entrance coupler 130 of the interferometer 133.

After passing through the polarisation from rotator (if present) the signal pulses are then fed into the imbalanced Mach-Zender interferometer 133 through a polarisation maintaining fibre coupler 130. Signal pulses are coupled into the same axis (usually the slow axis) of the polarisation maintaining fibre, of both output arms of the polarisation maintaining fibre coupler 130. One output arm of the fibre coupler 130 is connected to the long arm 132 of the interferometer 133 while the other output arm of the coupler 130 is connected to the short arm 131 of the interferometer 133.

The long arm 132 of the interferometer 133 contains an optical fibre delay loop 135, while the short arm 131 contains a fibre optic phase modulator 134 which is configured to apply a phase shift of $\theta$. The fibre optic phase modulator 134 is connected to phase modulator driver 192 which is in turn connected to random number generator 194. Random number generator 194 is used to randomly select which phase shift $\theta$ should be applied. The random number generator 194 is connected to biasing electronics 109 which will be described in more detail later.

The length difference of the two arms 131 and 132 corresponds to an optical propagation delay of $t_{delay}$. Typically the length of the delay loop 135 may be chosen to produce a delay $t_{delay} \sim 5$ ns. Thus, a photon travelling through the long arm 132 will lag that travelling through the short arm 131 by a time of $t_{delay}$ at the exit 136 of the interferometer 133.

The two arms 131, 132 are combined together with a polarisation beam combiner 136 into a single mode fibre 138. The fibre inputs of the polarisation beam combiner 136 are aligned in such a way that only photons propagating along particular axes of the polarisation maintaining fibre are output from the combiner 136. Typically, photons which propagate along the slow axis or the fast axis are output by combiner 136 into fibre 138.

The polarising beam combiner 136 has two input ports, an in-line input port and a 90° input port. One of the input ports is connected to the long arm 132 of the interferometer 133 and the other input port is connected to the short arm 131 of the interferometer 133.

In this example, only photons polarised along the slow axis of the in-line input fibre of the in-line input port are transmitted by the polarising beam combiner 136 and pass into the fibre 138. Photons polarised along the fast axis of the in-line input fibre of the input port are reflected and lost.

Meanwhile, at the 90° input port of the beam coupler 136, only photons polarised along the slow axis of the 90° input fibre are reflected by the beam combiner 136 and pass into the output port, while those polarised along the fast axis will be transmitted out of the beam combiner 136 and lost.

This means that the slow axis of one of the two input fibres is rotated by 90° relative to the output port. Alternatively the polarisation may be rotated using a polarisation rotator (not shown) before one of the input ports of the polarising beam combiner (136).

Thus, photon pulses which passed through the long 132 and short arms 131 will have orthogonal polarisations.

The signal pulses are then strongly attenuated by the attenuator 137 so that the average number of photons per signal pulse $\mu \ll 1$.

The signal pulses which are outputted by the combiner 136 into single mode fibre 138 are then multiplexed with a bright laser clock source 102 at a different wavelength using a WDM coupler 139. The multiplexed signal is then transmitted to the receiver Bob 103 along an optical fibre link 105. The biasing electronics 109 synchronises the output of the clock source 102 with the signal pulse.

Bob's equipment 103 comprises WDM coupler 141, a clock recovery unit 142 connected to an output of coupler 141, a polarisation controller 144 connected to the other output of WDM coupler 141, an imbalanced Mach-Zender interferometer 156 connected to the output of polarisation controller 144, two single photon detectors A 161, B 163 connected to the output arms of interferometer 156 and biasing electronics 143 connected to the detectors 161, 163. Bob's interferometer 156 contains an entrance polarising beam splitter 151 connected to both: a long arm 153 containing a delay loop 154 and a variable delay line 157; and a short arm 152 containing a phase modulator 155. The long arm 153 and short arm 152 are connected to an exit polarisation maintaining 50/50 fibre coupler 158. All components in Bob's interferometer 156 are polarisation maintaining.

Bob's equipments also comprise biasing electronics 143, a phase modulator driver 195, and a random number generator 197.

Bob 103 first de-multiplexes the transmitted signal received from Alice 101 via fibre 105 using the WDM coupler 141. The bright clock laser 102 signal is routed to an optical receiver 142 to recover the clock signal for Bob 103 to synchronise with Alice 101.

The signal pulses which are separated from the clock pulses by WDM coupler 141 are fed into a polarisation controller 144 to restore the original polarisation of the signal pulses. This is done so that signal pulses which traveled the short arm 131 in Alice's interferometer 133, will pass the long arm 153 in Bob's interferometer 156. Similarly, signal pulses which traveled through the long arm 132 of Alice's interferometer 133 will travel through the short arm 152 of Bob' interferometer 156.

The signal then passes through Bob's interferometer 156. An entrance polarising beam splitter 151 divides the incident pulses with orthogonal linear polarisations. The two outputs of the entrance polarisation beam splitter 151 are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler 158. The long arm 153 of Bob's interferometer 156 contains an optical fibre delay loop 154 and a variable fibre delay line 157, and the short arm 152 contains a phase modulator 155 which is configured to apply a phase shift of θ (where θ=0° or 90°). Phase modulator 155 is connected to phase modulator driver 195. The phase modulator driver 195 is connected to random number generator 197. Random number generator 197 is used to determine the phase shift θ which is applied by the phase modulator 155. The two arms 152, 153 are connected to a 50/50 polarisation maintaining fibre coupler 158 with a single photon detector A 161, B 163 attached to each output arm.

Due to the use of polarising components, there are, in ideal cases, only two routes for a signal pulse travelling from the entrance of Alice's interferometer to the exit of Bob's interferometer:
  i. Alice's Long Arm 132-Bob's Short Arm 152 (L-S) and
  ii. Alice's Short Arm 131-Bob's Long Arm 153 (S-L).

The variable delay line 157 at Bob's interferometer 156 is adjusted to make the propagation time along routes (i) and (ii) almost equal, within the signal laser coherence time which is typically a few picoseconds for a semiconductor distributed feed back (DFB) laser diode, and thereby ensure interference of the two paths. Bob achieves this by adjusting the variable fibre delay line 157 prior to key transfer.

By controlling the voltages applied to their phase modulators 134, 155, Alice and Bob determine in tandem whether paths (i) and (ii) undergo constructive or destructive interference at detectors A 161 and B 163. The phase modulators 134, 155 are connected to respective biasing means 109 and 143 to ensure synchronisation.

The variable delay line 157 can be set such that there is constructive interference at detector A 161 (and thus destructive interference at detector B 163) for zero phase difference between Alice and Bob's phase modulators. Thus for zero phase difference between Alice's and Bob's modulators and for a perfect interferometer with 100% visibility, there will be a negligible count rate at detector B 163 and a finite count rate at A 161.

If, on the other hand, the phase difference between Alice and Bob's modulators 134, 155 is 180°, there should be destructive interference at detector A 161 (and thus negligible count rate) and constructive at detector B 163. For any other phase difference between their two modulators, there will be a finite probability that a photon may output at detector A 161 or detector B 163.

By using the above apparatus, a key can be exchanged between Alice 101 to Bob 103. One of the protocols for exchanging information from Alice 101 to Bob 103 is the BB84 protocol. In the BB84 protocol Alice and Bob agree that Alice will use her emitter to send photons having one of four phase states. These phase states are defined by Alice using her phase modulator 134 to apply one of 4 different phase shifts θ, namely 0°, 90°, 180° or 270°. The phase modulator 134 is driven by the phase modulator driver 192, which outputs voltage pulses with random sequence of four different voltages. The random sequence is determined by the random number generator 194. These phase states define two phase bases {0°, 180°} and {90°, 270°}. In this particular example, the basis are rotated by 90° from one another, the basis may be rotated by other angle providing that the bases are not oriented by 180° or an integer multiple of 180° from one another. There are two orthogonal states per encoding set, {0° (bit0), 180°(bit1)} for the first encoding set using first encoding basis and {90° (bit 0), 270° (bit 1)} for the second encoding set using second encoding basis.

Alice sends the photons to Bob using the quantum channel randomly selecting a state by randomly applying a phase shift of 0°, 90°, 180° or 270°.

Bob determines the phase of the received photons randomly varying his measuring basis between the two basis defined by Alice. As explained above Alice's emitter and Bob's receiver are configured so that if there is zero phase difference between Alice's and Bob's modulators and for a perfect interferometer with 100% visibility, there will be a negligible count rate at detector B 163 and a finite count rate at A 161. Similarly, if, the phase difference between Alice and Bob's modulators 134, 155 is 180°, there should be destructive interference at detector A 161 (and thus negligible count rate) and constructive at detector B 163. For any other phase difference between their two modulators, there will be a finite probability that a photon may output at detector A 161 or detector B 163.

Thus, by applying a phase shift of 0°, Bob is measuring in the basis defined by Alice applying a phase shift of 0° or 180° and by applying a phase shift of 90°, Bob is measuring in the basis defined by Alice applying a phase shift of 90° or 270°.

If Bob chooses the correct basis, then he can distinguish between the two states which Alice uses in each basis with a theoretical accuracy of 100%. Errors can occur due to noise. However, if Bob uses the wrong basis, he will get the correct answer with a probability of a half, and the incorrect answer with a probability of a half.

Bob communicates with Alice on the classical channel and tells her which basis he used to measure each of the photons he received. However, he does not tell Alice his results. Bob tells Alice which photons he received as some of the photons sent by Alice will not reach Bob. The problem of 'missing' photons is generally addressed by sending the stream of photons with a predetermined period between each photon. Thus, Bob knows when he should receive a photon so he can tell if a photon has been lost.

Alice then tells Bob over a classical channel which results to keep. Bob should only keep the results which were measured in the correct basis.

Bob's results measured in the incorrect basis are discarded and a key is established from the kept results.

Assuming that n photons were detected by Bob, approximately n/2 photons (or the results from those photons) are discarded, and n/2 kept.

Now that Bob and Alice agree on the key, they must check to see if the key has been intercepted b an eavesdropper, Eve. Eve could intercept every photon sent by Alice, measure the state of the photon and then copy her result onto Bob to maximise her knowledge of the key. Prior to measurement, Eve would only know the two bases, which are to be used. Therefore, like Bob, she could randomly change the basis of her polarisation measurements, or she would fix her measurement basis throughout, or she could switch between the two bases balancing her measurements to favouring on of the two bases. Eve can choose her tactic according to what Bob and Alice are doing.

If Eve uses each basis 50% of the time, then, like Bob, she would expect to get the basis right 50% of the time for fixed basis/random switching. Therefore, the key which Eve transmits to Bob will have an error rate of approximately 50% in basis, as Eve will only measure half the key using the correct basis. If she measures the key in the wrong basis, and copies her result on to Bob, and he makes measurement in correct basis, he has approximately a 50:50 chance of correct answer. Thus, by eavesdropping in this way Eve introduces errors at a rate of approximately 25% into established key.

In order for Bob and Alice to check for Eve's presence, they need to compare a part of their established or agreed key i.e. after they have discarded approximately 50%. If there are errors which are greater than the noise error rate in the quantum channel 105 (FIG. 1) in their key, then Alice and Bob know that Eve has intercepted the key. Thus, they must repeat the procedure preferably using a different quantum channel.

In this known prior art, there is no authentication for the quantum channel.

Figure 2:
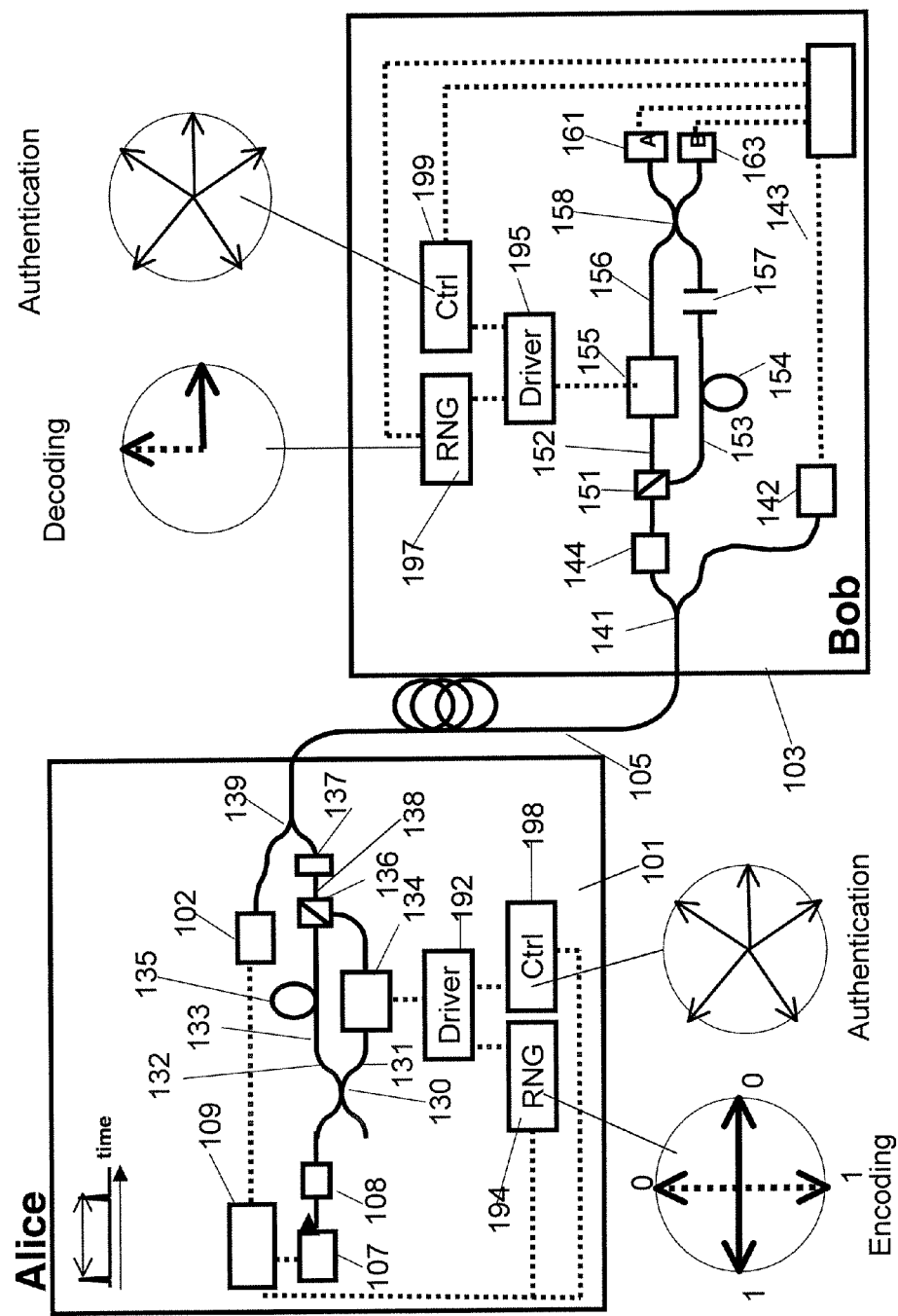
FIG. 2 schematically illustrates a quantum communication system in accordance with a preferred embodiment of the present invention.

FIG. 2 schematically illustrates a quantum communication system in accordance with a preferred embodiment of the present invention. The apparatus is similar to that shown in FIG. 1 and to avoid unnecessary repetition like reference numerals will be used to denote like features. However, the apparatus of FIG. 2 differs from that of FIG. 1 in that an authentication controller 198 is added to Alice's equipments in FIG. 2. The authentication controller 198 controls the phase modulator driver 192 jointly with the randomly number generator 194. The random number generator 194 randomly selects the random encoding phase delay component i.e. 0°, 90°, 180° or 270°. On top of this random delay component, an authentication delay component $\Delta\phi$ is determined by the authentication controller 198 and is also applied to the phase modulator 134 through the phase modulator driver 192. The phase modulator driver 192 now outputs voltage pulses to the phase modulator 134 which in turn produces both the random phase delays and the authentication delays. The authentication phase delays consists n (n$\geq$2) different values.

The authentication controller 198 can be a processor, which stores the authentication sequence. It gives instructions to the phase modulator driver 192 for modulating each laser signal pulse.

The apparatus of FIG. 2 also differs from that of FIG. 1 in that Bob also has an authentication controller 199 to control Bob's phase modulator driver 195 jointly with Bob's random number generator 197. The random number generator 197 randomly selects the encoding phase delay component to apply to phase modulator 155 through phase modulator driver 195. On top of this random delay an authentication delay $\Delta\phi$ is determined by the authentication controller and is applied to the phase modulator. The phase modulator driver now output voltage pulses to the phase modulator which in turn produces both the random phase delay component and the authentication delay component. Authentication phase delay component may be selected from n (n$\geq$2) different values.

FIG. 3 is a table showing how Alice and Bob use their authentication controllers and modulators in a the apparatus of FIG. 2 when using a communication method in accordance with an embodiment of the present invention which is based on the BB84 protocol.

When sending photon pulses Alice's modulator 134 applies a phase shift having two components. The first component is randomly chosen from 0°, 90°, 180° or 270°. As before, these phase states define two non-orthogonal phase bases {0°, 180°} and {90°, 270°}. The second component $\Delta\phi$ can be any phase delay and may vary for each photon pulse in a pseudo-random way. However, in this embodiment, prior to sending encoded photons, Alice and Bob must pre-share a secret random number (authentication key), through which Alice and Bob can derive $\Delta\phi$ for each modulation deterministically.

When Bob receives the pulses he then applies a phase shift with his modulator 155 which has two components, the first component which is selected randomly from 0° and 90° as in the standard BB84 protocol and a second "authentication" component $\Delta\phi$ which is exactly the same phase shift $\Delta\phi$ applied by Alice for the same pulse. Thus, when considering the phase difference between the phase shifts applied by Alice and Bob's modulators, if both Alice and Bob use the same second component, the second component $\Delta\phi$ cancels out leaving the analysis process the same as that for BB84.

If eavesdropper Eve is present and tries to measure each photon, she now has to choose from essentially a potentially infinite number of measurement bases unless she has prior knowledge of the second component. If she does not have prior knowledge of the second component or only partial knowledge of the second component her error rate will substantially increase.

FIG. 4 is a table showing how Alice and Bob use their authentication controllers together with the random number generators and phase modulators in the apparatus of FIG. 2 when using a communication method in accordance with an embodiment of the present invention which is based on the B92 protocol.

When sending photon pulses Alice's modulator applies a phase shift having two components. The first component is randomly chosen from 0° or 90°. The second component $\Delta\phi$ can be any angle and may be different for each photon pulse. However, Alice and Bob may pre-share a secret random number and expand the number deterministically to derive $\Delta\phi$.

When Bob receives the pulses he then applies a phase shift with his modulator 193 which has two components, the first component which is selected randomly from 180° and 270° as in the standard B92 protocol and a second "authentication" component Δϕ which is exactly the same phase shift Δϕ applied by Alice for the same pulse. Thus, when considering the phase difference between the phase shifts applied by Alice and Bob's modulators, if both Alice and Bob use the same second component, the second component Δϕ cancels out leaving the analysis process the same as that for B92.

Again, as Eve now has to choose between a possibly infinite numbers of measurement bases her error rate will be extremely high, she will not be able to obtain any useful information about the key and will be easily detected.

A multiple basis protocol has been described in GB2 368 502, where Alice and/or Bob switch randomly between 3 or more non-orthogonal bases. This scheme has been proposed to counter attack Eve measuring using an intermediate basis. For example, if Alice and Bob are using the BB84 protocol exactly as described with reference to FIG. 2, Eve may set her modulator to add a phase shift of 45°. For the reasons described in detail in GB2 368 502, Eve will introduce errors at the same rate as for conventional eavesdropping (25%). However, she gains more information about the key. With conventional eavesdropping, Eve has a key which is 75% of the bits statistically correct, with intermediate eavesdropper; she has a key with roughly 85% of the bits statistically correct.

To negate the effects of Eve measuring in an intermediate basis, Alice and Bob agree on three different bases to send the information say {0°, 180°}, {60°, 240°} and {120°, 300°}. As before for BB84, each basis has two orthogonal states and each basis is rotated by 60°. This additional basis increase Eve's error rate even if she uses two intermediate basis (one at 30° and one at 90°).

The BB84 protocol can be used in the same way as previously described, but this time when Alice and Bob compare basis there are three or more bases not just two.

FIG. 5 is a table showing how a method in accordance with a preferred embodiment of the present invention may be applied to a BB84 style protocol using multiple bases. Alice applies a phase shift made from two components, the first component is a state selected from {0°, 180°}, {60°, 240°} and {120°, 300°}, the second component Δϕ an be any angle and may be different for each photon pulse. As before Alice and Bob agree on Δϕ secretly before Alice sends the photon pulses to Bob. Bob measures each pulse using his modulator which can apply a phase drift comprising two components, one of the components is selected randomly from 0°, 60° and 120° the other component is Δϕ as pre-agreed with Alice.

As both Alice and Bob use the same Δϕ, the second component cancels out when comparing the phase difference between Alice and Bob's interferometers and hence the analysis is the same as described in GB2 368 502 and shown in FIG. 5.

Although three bases have been used to describe a multiple basis method, four or more basis may also be used.

Figure 6:
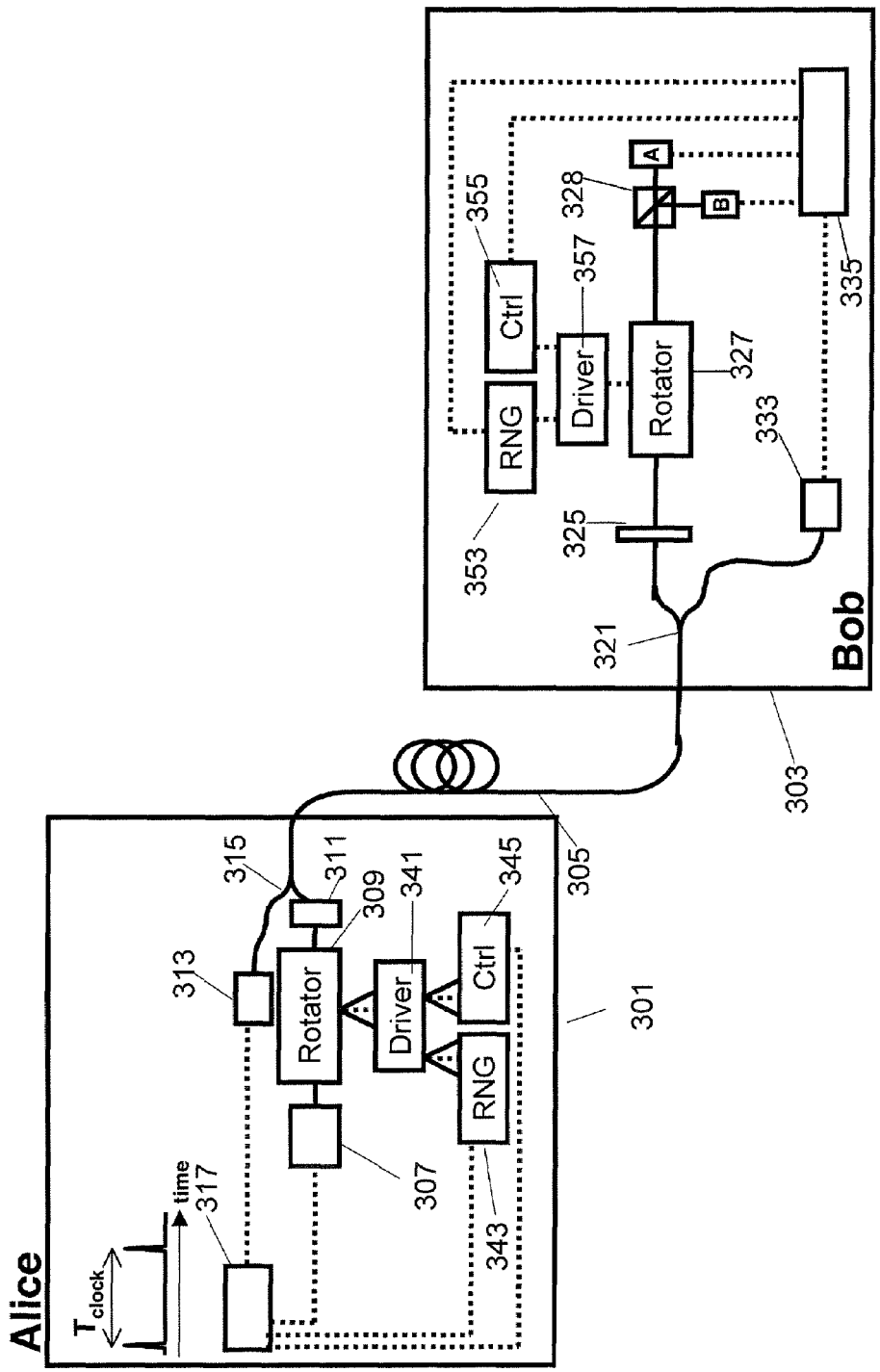
FIG. 6 schematically illustrates a quantum communication system using polarisation encoding in accordance with an embodiment of the present invention.

The method and apparatus of the present invention has been described with reference to phase encoding. However, it is also possible to use polarisation encoding with the present invention. FIG. 6 schematically illustrates an apparatus in accordance with an embodiment of the present invention which can perform polarisation encoding.

As for the phase encoding the sender Alice 301 sends encoded photons to receiver Bob 303 over optical fibre 305.

Alice's equipment 301 comprises a signal laser diode 307, a variable polarisation rotator 309 configured to rotate the polarisation of pulses from signal laser diode 307, an attenuator 311 connected to the output of polarisation rotator 309, a bright clock laser 313, a wavelength division multiplexing (WDM) coupler 315 coupling the output from attenuator 311 and clock laser 313 and bias electronics 317 connected to said signal laser diode 307 and clock laser 313.

Alice's equipment also comprises biasing electronics 317, a polarisation rotator driver 341, a random number generator 343 and an authentication controller (345).

During each clock signal, the signal diode laser 307 outputs one optical pulse. The signal diode laser 307 is connected to biasing electronics 317 which instruct the signal diode laser 307 to output the optical pulse. The biasing electronics are also connected to clock laser 313.

The linearly polarised signal pulses outputted by diode laser 307 are rotated by polarisation rotator 309. The polarisation rotator applies a rotation under the control of driver 341 comprising two components, a first component which is controlled by the random number generator 343 to be selected randomly from a rotation by angle 0°, 45°, 90° or 135° and a second authentication component Δϕ which is controlled by the authentication controller 345. The authentication controller 345 may be a micro-processor which stores an authentication sequence which determines the authentication component Δϕ for each signal pulse. The authentication component Δϕ may be selected from n (n≧2) different values for each signal pulse. The signal pulses are then strongly attenuated by the attenuator 311 so that the average number of photons per signal pulse (μ) averages approximately of μ=0.1~1.

The signal pulses are then multiplexed with a bright laser clock source 313 at a different wavelength using a WDM coupler 315. The multiplexed signal is then transmitted to the receiver Bob 303 along an optical fibre link 305. The biasing electronics 317 synchronises the output of the clock source 313 with the signal pulse.

Bob's equipment 303 comprises WDM coupler 321, a clock recovery unit 333 connected to an output of coupler 321, a polarisation controller 325 connected to the other output of WDM coupler 321, a polarisation rotator 327 connected to the output of polarisation controller 325, a polarising beam splitter 328 connected to the output of polarisation rotator 327 and two single photon detectors A and B connected to the outputs of the polarising beam splitter 328 and biasing electronics 335 connected to the detectors A and B and the clock signal recovery unit 333.

Bob's equipment 303 also comprises a polarisation rotator driver 357, a random number generator 353, and an authentication controller 355. The random number generator 353 and authentication controller 355 operate under the control of biasing electronics.

Bob first de-multiplexes the transmitted signal received from Alice 301 via fibre 305 using the WDM coupler 321. The bright clock laser 313 signal is routed to an optical receiver 333 to recover the clock signal for Bob 303 to synchronise with Alice 301.

The signal pulses which are separated from the clock pulses by WDM coupler 321 are fed into a polarisation controller 325 to restore the original polarisation of the signal pulses to correct for any rotation which has happened during transmission down fibre 305.

The signal then passes through Bob's polarisation rotator 327. The polarisation rotator 327 rotates the polarisation of the photon pulses under the control of driver 351. The polarisation is rotated by two components, a first component controlled by the random number generator 353 which selects randomly from 0° and 45° and a second authentication component Δϕ. The authentication component is controlled by the authentication controller 355, and is the same component applied by Alice's rotator 309. Bob's rotator 327 rotates the polarisation in the opposite direction to Alice's rotator 309.

The pulses are then passed into polarising beam splitter 328 which passes vertically polarised pulses to detector A and horizontally polarised pulses to detector B. If the pulses reaching polarising beam splitter 328 are not horizontally or vertically polarised, they may be directed to either detector A or B.

By controlling the rotation applied by rotators 309 and 327 Alice and Bob determine in tandem whether photons are measured at detector A or detector B.

FIG. 7 is a table showing how Alice and Bob use their modulators in the apparatus of FIG. 6 when using a communication method in accordance with an embodiment of the present invention which is based on the BB84 protocol.

When sending photon pulses Alice's modulator applies a rotation having two components. The first component is randomly chosen from 0°, 45°, 90° or 135° by the random number generator 343. As before, these phase states define two non-orthogonal phase bases {0°, 90°} and {45°, 135°}. The second component Δϕ set by the authentication controller can be any angle and may be different for each photon pulse. However, prior to sending the photon pulses Alice and Bob pre-share a random number (authentication key) and expand the number deterministically to derive Δϕ. Δϕ for each pulse is only known to Alice and Bob, not to anyone else.

When Bob receives the pulses he then applies a rotation (in the opposite direction to Alice's rotation) with his rotator 327 which has two components, the first component which is selected randomly from 0° and 45° as in the standard BB84 protocol and a second "authentication" component Δϕ which is exactly the same rotation Δϕ applied by Alice for the same pulse but in the opposite direction. Thus, when considering the overall polarisation rotation applied by Alice and Bob's rotators, if both Alice and Bob use the same second component, the second component Δϕ cancels out leaving the analysis process the same as that for BB84.

If eavesdropper Eve is present and tries to measure each photon and copy her result to Bob, she now has to choose from essentially an infinite number of measurement bases unless she has prior knowledge of the second component. If she does not have prior knowledge of the second component or only partial knowledge of the second component her error rate will substantially increase. Thus, Bob's error rate will increase and the presence of Eve will be quickly spotted.

Although polarisation encoding has only been described in relation to the BB84 protocol, the method of this preferred embodiment may also be used with both the B92 protocol and multiple bases.

Figure 8:
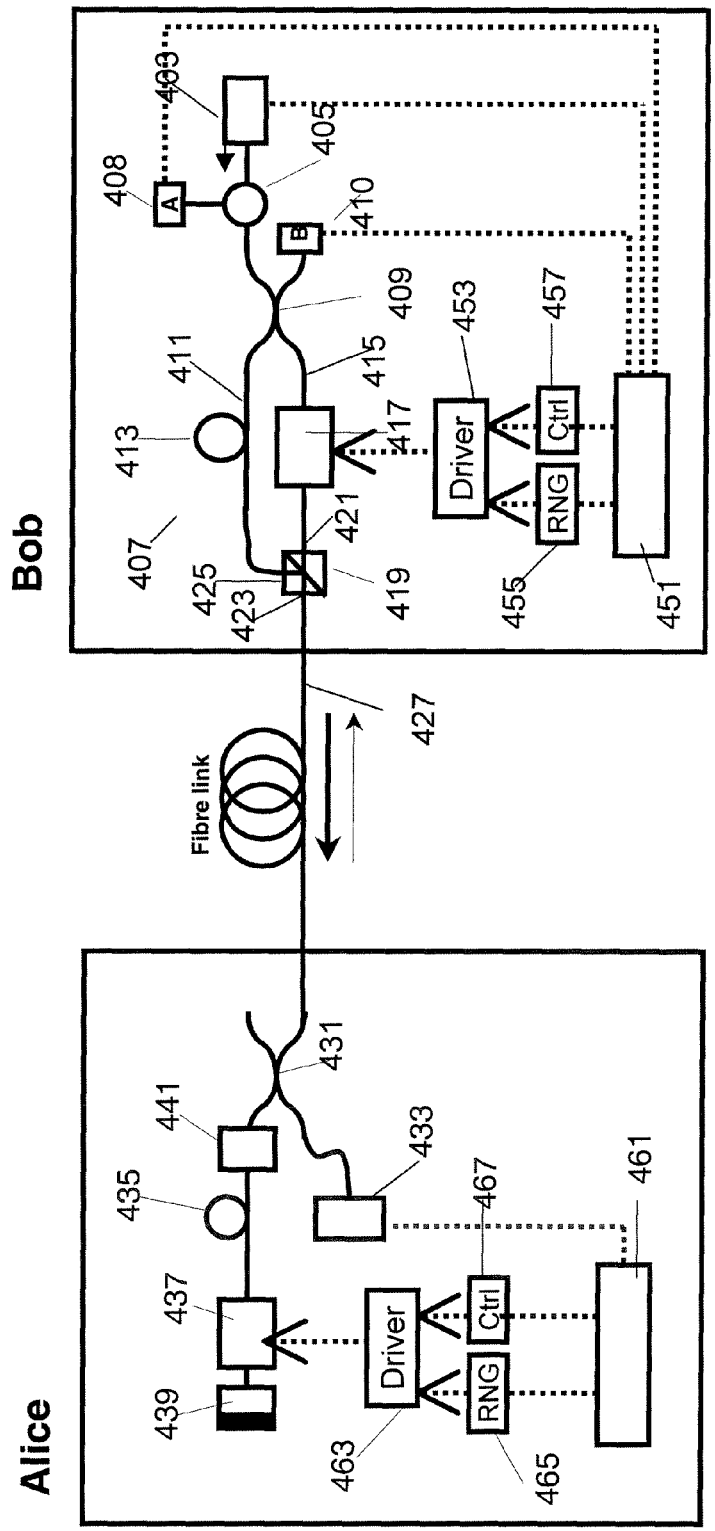
FIG. 8 schematically illustrates an auto-compensating apparatus for multiple pulse quantum cryptography in accordance with a preferred embodiment of the present invention.

FIG. 8 schematically illustrates an auto-compensating apparatus for quantum cryptography in accordance with a preferred embodiment of the present invention. Bob's equipment 401 comprises a signal laser diode 403, a fibre circulator 405, an imbalanced Mach-Zender polarisation maintaining fibre interferometer 407, two single photon detectors 408, 410, biasing electronics 451, a phase modulator driver 453 which is controlled jointly by a random number generator 455 and an authentication controller 457.

Bob's Mach-Zender interferometer 407 contains a 50/50 polarisation maintaining fibre coupler 409, a long arm 411 with a fibre delay loop 413, a short arm 415 with a phase modulator 417 and a polarisation beam splitter/combiner 419.

The biasing electronics 451 produce a clock signal for synchronisation with period $T_{clock}$, which may typically be 1 µs. The laser diode is biased to emit an optical pulse upon each clock cycle.

The laser 403 is linearly polarised. The laser pulses are coupled into a particular polarisation axis, usually the slow axis, of a polarisation maintaining fibre.

The optical pulses are then fed into the imbalanced interferometer 407 through a circulator 405 and a polarisation maintaining fibre coupler 409. The length difference between the long arm 411 and the short arm 415 of the interferometer corresponds to an optical propagation delay of $t_{delay}$. A pulse travelling through the long arm 411 (referred to below as the 'late pulse') will lag that travelling through the short arm 415 ('early pulse') by a time delay at the port 423 of the polarisation beam combiner/splitter 419 of the interferometer 407.

The long arm 411 and the short arm 415 are combined with a polarisation beam splitter/combiner 419. The fibre inputs of the polarisation beam combiner 419 are aligned in such a way that only photons propagating along a particular axis of the polarisation maintaining input fibre, usually the slow axis, are output from the combiner. For example, at the in-line input port 421, only photons polarised along the slow axis of the in-line input fibre are transmitted by the beam combiner/splitter 419 and pass into the output port 423 and photons polarised along the fast axis are reflected and lost. Meanwhile, at the 90° input port 425, only photons polarised along the slow axis of the 90° input fibre are reflected by the beam combiner 419 and pass into the output port, while those polarised along the fast axis will be transmitted and lost.

This means that the slow axis of one of the two input fibres is rotated by 90° relative to the output port. Alternatively the polarisation may be rotated using a polarisation rotator before one of the input ports of the polarising beam combiner. Thus photon pulses which passed through the long 411 and short 415 arms will have orthogonal linear polarisations on the output fibre 427.

The pulses are then transmitted to Alice along an optical fibre link 427. No further clock signal need be sent. The pulses are not attenuated before they are sent.

Alice's equipment comprises an asymmetric fibre coupler 431, a photo receiver 433 connected to one port of the asymmetric fibre coupler, an attenuator 441, a fibre delay loop 435, a phase modulator 437, a Faraday mirror 439, biasing electronics 461, and a phase modulator driver 463 which is controlled jointly by a random number generator 465 and an authentication controller 467.

Alice first uses a fibre coupler 431 with an asymmetric coupling ratio, for example 90/10, to route 90% of signals into a photodetector 433 to measure the signal pulse intensity and also recover the clock.

The exit from other arm of the fibre coupler is fed into a storage line 435 after passing an attenuator 441, then a phase modulator 437, and a Faraday mirror 439. The Faraday mirror 439 has the effect of rotating the polarisation of the incident pulses by 90°. The signal pulses reflected by the Faraday mirror pass back through the phase the modulator 437, the storage line 435, the attenuator 441 and the fibre coupler 431 subsequently. The reflected pulses then return to Bob along the optical fibre link.

Alice applies a voltage to her phase modulator 437 when the early (i.e. that which passed through the phase modulator 417 in Bob's interferometer) pulse passes back through her phase modulator after reflection at the Faraday mirror 439.

Before the pulses leaving Alice's coupler, they are attenuated so that the average number of photons per pulse typically of $\mu=0.1\ldots1$ for the signal pulses leaving Alice's apparatus. The level of attenuation is chosen according to the signal pulse intensity measured by the Alice's power meter 433.

When the signal pulses return to Bob's polarisation beam splitter, the polarisations of each early and late pulse have been swapped due to the reflection of the Faraday mirror 439 in Alice's equipment. So, the late pulse will be transmitted by the polarisation beam splitter 423 and propagate along the Short Arm, while the early pulse will be reflected into the Long Arm. They will then be fed into the polarisation maintaining fibre coupler.

There are two routes for a photon travelling from the Bob's fibre coupler to Alice and then reflected back to the Bob's coupler:

1. Bob's Long Arm-Alice-Bob's Short Arm
2. Bob's Short Arm-Alice-Bob's Long Arm

The total length is exactly identical because a photon passes all the same components but just with different sequences. There is no need to actively balance the length of the two routes, as they are virtually the same and are automatically self-compensated. A photon passing two routes interferes with itself at Bob's polarisation maintaining fibre coupler.

By controlling the voltages applied to their modulators when the reflected pulses passing through, Alice and Bob determine in tandem whether two routes undergo constructive or destructive interference at each detector. Alice only modulates the reflected early pulse, while Bob modulates the reflected late pulse.

The polarisation maintaining fibre coupler at Bob's interferometer is attached to two single photon detectors, one of which is through a fibre circulator. This arrangement can be used to implement BB84 or B92 in a similar manner to those described previously.

As described with reference to the apparatus of FIG. 2, when Alice modulates the pulse she chooses a phase shift made up from two components. The first component is randomly chosen from 0°, 90°, 180° or 270° by the random number generator. As before, these phase states define two non-orthogonal phase bases {0°, 180°} and {90°, 270°}. The second authentication component $\Delta\phi$ can be any angle and may be different for each photon pulse. However, before Bob sends the unmodulated pulses to Alice, Alice and Bob agree on what $\Delta\phi$ should be used for each pulse, for example, by deriving $\Delta\phi$ through expanding a pre-shared secret random number (authentication key).

When Bob receives the reflected pulses he then applies a phase shift with his modulator 417 which has two components, the first component which is selected randomly from 0° and 90° as in the standard BB84 protocol and a second "authentication" component $\Delta\phi$ which is exactly the same phase shift $\Delta\phi$ applied by Alice for the same pulse. Thus, when considering the phase difference between the phase shifts applied by Alice and Bob's modulators, if both Alice and Bob use the same second authentication component, the second component $\Delta\phi$ cancels out leaving the analysis process the same as that for BB84.

The apparatus of FIG. 8 may also be used for the B92 protocol and multiple bases as previously described.

Figure 9:
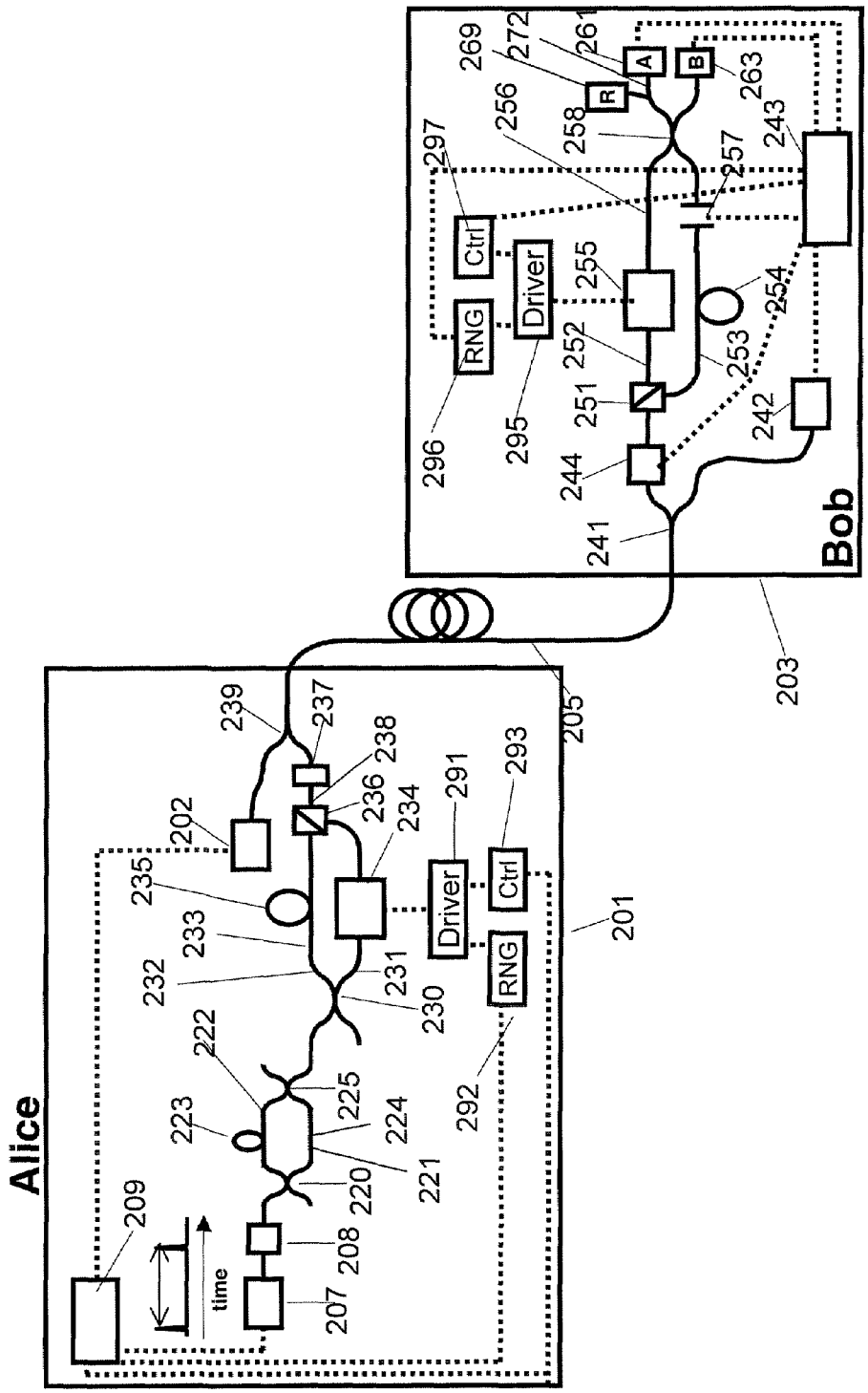
FIG. 9 schematically illustrates a quantum communication system using phase encoding in accordance with an embodiment of the present invention using a reference signal as well as data signals.

FIG. 9 shows an apparatus for quantum cryptography with active stabilisation in accordance with an embodiment of the present invention.

Alice and Bob's equipment is similar to that described with reference to FIG. 2. However, here the apparatus is configured so that a reference pulse may be sent from Alice 201 to Bob 203 and Bob's receiver is able to analyse the reference pulse and stabilise any phase or polarisation drift within the system.

As described with reference to FIGS. 1 and 2, Alice 201 sends photons to Bob 203 along fibre 205.

Alice's equipment 201 comprises a signal laser diode 207, a polarisation rotator 208 connected to the output of said signal laser diode 207, a signal/reference pulse separator 224 connected to the output of said polarisation rotator 208, an imbalanced fibre Mach-Zender interferometer 233 for encoding photons connected to the output of the signal/reference pulse separator 224, an attenuator 237 connected to the output of the interferometer 233, a bright clock laser 202, a wavelength division multiplexing (WDM) coupler 239 connected to both the output of the attenuator 237 and the bright clock laser 202 and bias electronics 209. The biasing electronics 209 are connected to both the clock laser 202 and the signal laser 207.

The signal/reference pulse separator 224 comprises an entrance fibre optic coupler 220 with a first output connected to a long arm 222 with a loop of fibre 223 designed to cause an optical delay and short arm 221. The separator 224 further comprises an exit fibre optic coupler 225 combining two arms 221 and 222. All fibre in separator 224 is polarisation maintaining.

The encoding interferometer 233 is identical to that described in FIG. 2 and comprises an entrance coupler 230, a long arm 232 with a loop of fibre 235 designed to cause an optical delay, a short arm 231 with a phase modulator 234, and an exit polarising beam combiner 236. All components used in Alice's interferometer 233 are polarisation maintaining. The phase modulator 234 is controlled by phase modulator driver 291. The driver 291 receives inputs from both random number generator 292 and authentication controller 293 which operate in the same manner as described with reference to FIG. 2.

During each clock signal, the signal laser diode laser 207 outputs one optical pulse under the control of biasing electronics 209.

The polarisation of the signal pulses is rotated by a polarisation rotator 208 so that the polarisation is aligned to be parallel to a particular axis of the polarisation maintaining fibre, usually the slow axis, of the entrance coupler 220 of separator 224. Alternatively the polarisation rotator 208 may be omitted by rotating the signal laser diode 207 with respect to the axes of the entrance coupler 220 of separator 224.

The signal pulses are then fed into the signal/reference pulse separator 224 through polarisation maintaining fibre coupler 220. Signal pulses are coupled into the same axis, usually the slow axis of the polarisation maintaining fibre, from both output arms of the polarisation maintaining fibre coupler 220.

The long arm 222 of the signal/reference pulse separator 224 contains an optical fibre delay loop 223. The length difference of the two arms 221 and 222 corresponds to an optical propagation delay of $t_{reference}$. Typically the length of the delay loop 223 may be chosen to produce a delay $t_{reference}$~10 ns. A photon travelling through the long arm 222 will lag that travelling through the short arm 221 by a time of $t_{reference}$ at the exit coupler 225 of the splitter 224.

The two arms 221 and 222 are combined together with an exit polarisation maintaining fibre optic coupler 225. One output is connected into one input of the encoding Mach-Zender interferometer 233.

Coupling ratio of two couplers 220 and 225 can be either fixed or variable. The ratios are chosen so that the reference and signal pulses have unequal intensities. Typically, before entering the encoding interferometer 233, the later reference pulse is 10-10000 times stronger than the earlier signal pulse. For example, the entrance coupler 220 may be asymmetric so as to allow 90% to 99.99% of the input into arm 221 and the exit coupler 225 may be a 50/50 coupler. Alternatively, both the entrance 220 and exit couplers 225 may be 50/50 couplers and an appropriate attenuator placed in arm 221. Properties of the signal and reference pulses are exactly the same, for example polarisation, wavelength etc, except of course for their intensity and time of injection into the interferometer 233.

The signal and reference pulses are then fed into the imbalanced Mach-Zender interferometer 233 through a polarisation maintaining fibre coupler 230. Signal and reference pulses are coupled into the same axis, usually the slow axis of the polarisation maintaining fibre, from both output arms of the polarisation maintaining fibre coupler 230.

The long arm 232 of the interferometer 233 contains an optical fibre delay loop 235, while the short arm 231 contains a fibre optic phase modulator 234. The length difference of the two arms 231 and 232 corresponds to an optical propagation delay of $t_{delay}$. Typically the length of the delay loop 235 may be chosen to produce a delay $t_{delay}$~5 ns. A photon travelling through the long arm 232 will lag that travelling through the short arm 231 by a time of $t_{delay}$ at the exit 236 of the interferometer 233.

The two arms 231, 232 are combined together with a polarisation beam combiner 236 into a single mode fibre 238. The fibre inputs of the polarisation beam combiner 236 are aligned in such a way that only photons propagating along particular axes of the polarisation maintaining fibre are output from the combiner 236. Typically, photons which propagate along the slow axis or the fast axis are output by combiner 236 into single mode fibre 238.

The polarising beam combiner 236 has two input ports, an in-line input port and a 90° input port. One of the input ports is connected to the long arm 232 of the interferometer 233 and the other input port is connected to the short arm 231 of the interferometer 233.

Only photons polarised along the slow axis of the in-line input fibre of the in-line input port are transmitted by the polarising beam combiner 236 and pass into the fibre 238. Photons polarised along the fast axis of the in-line input fibre of the input port are reflected and lost.

Meanwhile, at the 90° input port of the beam coupler 236, only photons polarised along the slow axis of the 90° input fibre are reflected by the beam combiner 236 and pass into the output port, while those polarised along the fast axis will be transmitted out of the beam combiner 236 and lost.

This means that the slow axis of one of the two input fibres is rotated by 90° relative to the output port. Alternatively the polarisation may be rotated using a polarisation rotator before one of the input ports of the polarising beam combiner.

Thus, photon pulses which passed through the long 232 and short arms 231 will have orthogonal polarisations.

Both the signal and reference pulses are then strongly attenuated by the attenuator 237 so that the average number of photons per pulse typically of $\mu$=0.1 . . . 1 for the signal pulses. The reference pulses are typically 10-1000 stronger than the signal pulses, and do not have to be attenuated to single photon level as information is only encoded upon signal pulses.

The attenuated pulses are then multiplexed with a bright laser clock source 202 at a different wavelength using a WDM coupler 239. The multiplexed signal is then transmitted to the receiver Bob 203 along an optical fibre link 205.

The clock may also be delivered in other ways. For example Alice may multiplex the signal pulses with a bright clock laser pulse at the same or different wavelength which is delayed relative to the start of the clock cycle and which does not coincide with the signal pulses. Alternatively the clock signal may be sent on a separate optical fibre. Alternatively, synchronisation may be achieved by using a timing reference.

Bob's equipment 203 comprises WDM coupler 241, a clock recovery unit 242 connected to one output of said WDM coupler 241, a polarisation controller 244 connected to the other output of said WDM coupler 241, an imbalanced Mach-Zender interferometer 256 connected to the output of polarisation controller 244, two single photon detectors R 261, B 263 connected to the two outputs of interferometer 256 and biasing electronics 243.

Bob's interferometer 256 contains an entrance polarising beam splitter 251, a long arm 253 containing a delay loop 254 and a variable delay line 257 is connected to an output of beam splitter 251, a short arm 252 containing a phase modulator 255 is connected to the other output of said beam splitter 251, and an exit polarisation maintaining 50/50 fibre coupler 258 coupling the output from the long 253 and short 252 arms.

The phase modulator 255 is controlled by phase modulator driver 295. Phase modulator driver 295 receives inputs from random number generator 296 and authentication controller 297 which operate as described with reference to FIG. 2.

All components in Bob's interferometer 256 are polarisation maintaining.

Bob first de-multiplexes the transmitted signal received from fibre 205 using the WDM coupler 241. The bright clock laser 202 signal is routed to an optical receiver 242 to recover the clock signal for Bob to synchronise with Alice.

If Alice delivers the clock using an alternative method, Bob will recover the clock accordingly. If Alice sends the clock signal as a single bright pulse within each clock cycle which is delayed relative to signal pulses then Bob may use an imbalanced coupler, such as 90/10, to extract a fraction of the combined signal which is measured with a photo-diode. A clock pulse is then recovered if the incident intensity is above an appropriately set threshold. Alternatively Bob may detect the clock on a separate fibre or using a timing reference.

The signal pulses which are separated from the clock pulses by WDM coupler 241 are fed into a polarisation controller 244 to restore the original polarisation of the signal pulses. This is done so that signal pulses which traveled the short arm 231 in Alice's interferometer 233, will pass the long arm 253 in Bob's interferometer 256. Similarly, signal pulses which traveled through the long arm 232 of Alice's interferometer 233 will travel through the short arm 252 of Bob' interferometer 256.

The signal/reference pulses from signal laser 207 then pass through Bob's interferometer 256. An entrance polarising beam splitter 251 divides the incident pulses with orthogonal linear polarisations. The two outputs of the entrance polarisation beam splitter 251 are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler 258. The long arm 253 of Bob's interferometer 256 contains an optical fibre delay loop 254 and a variable fibre delay line 257, and the short arm 252 contains a phase modulator 255. The two arms 252, 253 are connected to a 50/50 polarisation maintaining fibre coupler 258 with a single photon detector A 261, a reference detector 268 sharing one output port through an asymmetric fibre coupler 272 and a single photon detector B 263 attached to the other output port. The coupling ratio of the asymmetric coupler 272 is typically 95/5, with 95% port attached with single photon detector A 261 for quantum key distribution, and the 5% port attached with single photon detector R 269 for monitoring and stabilising phase and polarisation drifts. The coupling ratio is chosen so high in order that the coupler 272 does not reduce photon count rate of the signal pulses significantly at the detector 261. Also, as the reference pulses can be set arbitrarily strong, 5% or even smaller coupling into the reference detector is enough for monitoring photon count rate of references pulses.

Due to the use of polarising components, there are, in ideal cases, only two routes for a signal pulse travelling from the entrance of Alice's encoding interferometer 233 to the exit of Bob's interferometer 256:

i. Alice's Long Arm 232-Bob's Short Arm 252 (L-S) and
ii. Alice's Short Arm 231-Bob's Long Arm 253 (S-L).

The variable delay line 257 at Bob's interferometer 256 is adjusted to make the propagation time along routes (i) and (ii) almost equal, within the signal laser coherence time which is typically a few picoseconds for a semiconductor distributed feed back (DFB) laser diode, and thereby ensure interference of the two paths.

The variable fibre delay line 257 can either be an airgap, or a fibre stretcher, driven by a piezo-electric actuator. Alternatively, the two delays can be balanced by carefully controlling the length of fibre in Alice's 233 and Bob's 256 interferometers. Fine adjustment of the length of the two optical paths can be achieved through the calibration of zero phase delay in the two modulators 234, 255.

It is important that the central arrival time window of the signal pulses at single photon detectors do not overlap temporally with any arrival windows of the reference pulses. Otherwise, interference visibility will decrease. This can be guaranteed by carefully choosing the lengths of the delay loops 223, 235 to ensure $t_{delay} < t_{reference}$.

The references pulses are used to actively monitor and stabilise the phase drift of Alice-Bob's encoding interferometer. The detector R can be a single photon detector. It is gated to be on only upon the central arrival time of the reference peak and measure the count rate. If the system were perfectly stable, the counting rate is constant. Any variation in phase drift will be manifested by a varying counting rate. Bob uses any variation in the count rate measured by the reference detector R 269 as a feedback signal to the variable delay line 257. Thus the optical delay is adjusted to stabilise the counting rate in the reference detector, and compensate any phase drifts of Alice or Bob's interferometers.

Bob can avoid using the delayline 257. The count rate measured by the reference detector R261 can be used a feedback signal to the phase modulator. The DC-bias applied to the phase modulator is then varied to stabilising the counting rate, and compensate any phase drifts of Alice or Bob's interferometers.

It is most convenient to maintain the reference detector with a minimum count rate. In this case, destructive interference is maintained at the reference detector R 269.

The reference detector R 269 and associated electronics should integrate the count rate over a certain period of time in order to average statistical fluctuation in the arrival rate of the reference photons. The integration time may typically be a fraction of a second, for example, 0.1 second. Such feedback times are sufficient since the phase drift of the Alice and Bob's interferometers occurs over much longer time scales. For highly unstable environment, much shorter feedback times, for example, 0.1 ms, may be employed. Alternatively, the feedback signal may be used to recalibrate the zero point of both phase modulators as described above. This may be done by varying the DC bias applied to modulators 255 and 234.

The feedback electronics may also condition system for sudden shocks to the system, such as a sudden change in temperature. If a sudden change in count rate is detected in the reference detector R 269, the results in the signal detector B 263 can be ignored until the system regains stability.

The references pulses are also used to actively monitor and stabilise the polarisation drift of photons. The two satellites peaks of the reference peak are due to imperfect polarisation control by the controller 244 and therefore imperfect polarisation beam splitting of the entrance polarisation beam splitter 251 of Bob's interferometer 256. The early satellite peak arises from the short arm 231 of Alice's encoding interferometer 233 to Bob's Short Arm 252, and the late satellite peak arises from the long arm 232 of Alice's encoding interferometer 233 to Bob's long arm 253. By gating the reference detector R 261 to detect during the arrival of one of the satellite peaks and measure the photon counting rate, Bob can monitor the drift in the polarisation of the photons and actively stabilise it by feeding the measurement result back into the polarisation controller 244. The polarisation controller 244 rotates the polarisation of photons so as to minimise the count rate of the satellite peak of the reference pulse in the reference detector R 269.

The reference detector R 269 should integrate photon counts over a certain period of time in order to reduce statistical fluctuation. The integration time can again be as short as a fraction of a second, for example, 0.1 second. This is typically much faster than the time scale over which the polarisation drifts. Much shorter integration time can be chosen for system operates in unstable conditions.

In the system of FIG. 9, Alice's modulator 234 and Bob's modulator 255 can be controlled in the same manner as described for Alice's modulator 134 and Bob's modulator in order to encode photons as described with reference to FIG. 2.

The reference pulses may be modulated by any of the above schemes in addition to the signal pulses. Thus, in order for Eve to measure the reference pulses correctly, she must also know their modulation which prevents Eve from obtaining information to stabilise her equipment and measure any pulses correctly.

FIG. 10 is a table illustrating a further coding method in accordance with an embodiment of the present invention. As described in more details above, Alice uses her modulator to effect a phase shift comprising two components. The first component is randomly chosen from 0°, 90°, 180° or 270°. As before, these phase states define two non-orthogonal phase bases {0°, 180°} and {90°, 270°}. The second component Δϕ can be any phase delay and may be different for each photon pulse. As before, prior to sending the photon pulses Alice and Bob must pre-share a secret random number and expand the number deterministically to derive Δϕ.

When Bob receives the pulses he then applies a phase shift with his modulator which has two components. However this time, Bob's the first component is selected randomly from 0°, 90°, 180° or 270°. His second "authentication" component Δϕ is exactly the same phase shift Δϕ applied by Alice for the same pulse. Bob's first component can be thought of in terms of two sub-components. A first subcomponent selected randomly from 0° and 90° which defines the measurement basis and a second sub-component of 0° or 180° which defines the detection inversion process, which inverts the probability of detection of two detectors (FIG. 2).

As before when considering the phase difference between the phase shifts applied by Alice and Bob's modulators, if both Alice and Bob use the same second component, the second component Δϕ cancels out. As Bob knows whether or not he selected 0° or 180° he take this into account after he has compared measurement basis with Alice to ensure that he uses the correct bit-value for the key.

The above method where Bob applies a further 0° or 180 phase shift can be used in any of the protocols described above.

FIG. 11 is a table illustrating a further coding method in accordance with an embodiment of the present invention. The encoding and decoding are exactly same as FIG. 10. However, FIG. 11 uses a different key sifting protocol. In this case, within each encoding set, Bob needs to distinguish two non-orthogonal states.

Two states representing bits 0 and 1 in each encoding set are non-orthogonal to each other. {0° (bit 0) and 270° (bit 1)} form one encoding set, while {90° (bit 0) and 180° (bit 1)} form the encoding set.

Because two states within each encoding set are non-orthogonal to each other, Bob is no longer able to discriminate two states deterministically. Key sifting therefore has to be based upon probabilistic measurements. Bob's measurement basis is chosen in such a way that he has only 50% probability to identify the state Alice encoded but is able to exclude the other state with 100% accuracy.

For example, to identify 0° in the encoding set {0°, 270°}, Bob's compatible measurement basis are either 90° or 270°. With either measurement basis, Bob can perform deterministic measurement on state {270°}, but only probabilistic measurement on state {0°}. When (i) a photon click at detector B and measurement basis 90° is used or (ii) a photon click at detector A and measurement basis 270° is used, Alice and Bob can agree a bit of 0. Details of the sifting table is summarised in FIG. 11 for using non-orthogonal encoding sets.

There is benefit of using non-orthogonal encoding sets. Using non-orthogonal encoding sets is resistant to photon number splitting attack. This type of attack is highly suppressed by using non-orthogonal encoding sets, because Eve cannot perform a deterministic discrimination between two non-orthogonal states even she can split a photon from each photon pulse.

The invention claimed is:

1. A system for transmitting quantum information comprising a sending unit and a receiving unit,
    said sending unit comprising an encoder including hardware, and configured to encode photon pulses of a sequence of photon pulses with quantum information by setting for each photon pulse of the sequence of photon pulses a single quantum state of a single parameter of that photon pulse, the single quantum state of the single parameter determined according to the combination of a first component and a second component, said encoder further comprising a random number generator configured to select said first component randomly, the second component being determined from information which is pre-shared with the receiving unit, said information being pre-shared before said sequence of photon pulses is sent, said information indicating a first value for the second component for a first pulse of the sequence of photon pulses and a second, different value for the second component for a second pulse of the sequence of photon pulses,
    said receiving unit comprising a decoder including hardware, and configured to perform a measurement on said photon pulses of a sequence of photon pulses using a measurement basis selected for each photon pulse of the sequence of photon pulses, using said pre-shared information, to cancel said second component and decode said quantum information from the photon pulses.

2. A system according to claim 1, wherein the encoder is configured to change the second component between each of successive photon pulses.

3. A system according to claim 1, wherein the encoder is configured to select the second component for each photon pulse from a fixed set of n values, where n is an integer greater than 1.

4. A system according to claim 1, wherein the encoder and decoder are provided with means to share or derive information concerning the second component.

5. A system according to claim 4, wherein both the encoder and decoder are configured to determine the second component from expansion of a shared secret seed key.

6. A system according to claim 1, wherein the encoder and decoder are a phase encoder and phase decoder respectively and wherein the second component is a phase shift.

7. A system according to claim 1, wherein the encoder and decoder are a polarisation encoder and polarisation decoder respectively and the second component is a rotation of the polarisation.

8. A system according to claim 1, wherein the encoder is configured to select the first component from a fixed set of N states, where N ($\geq 2$) is an integer.

9. A system according to claim 8, wherein some of the N states are non-orthogonal.

10. A system according to claim 8, wherein the N states can form encoding sets in which two states can either be orthogonal or non-orthogonal.

11. A system according to claim 1, wherein the system is fibre optics based.

12. A system according to claim 1, wherein the system is free-space based.

13. A decoder, for a quantum communication system, configured to decode quantum information from photon pulses of a sequence of photon pulses when the quantum information is held in a single quantum state of a single parameter of each of the photon pulses and the quantum state is set using the combination a first component and a second component of the single parameter, the decoder comprising an authentication controller configured to determine pre-shared information about the second component received from a source other than the source of the photon pulses and an interferometer configured to perform a measurement on a measurement basis selected to cancel the second component before determining said quantum information from the photon pulses, said decoder further comprising a random number generator configured to randomly select a measurement basis for determining said quantum information,
    wherein said source other than the source of photon pulses indicates a first value for the second component for a first pulse of the sequence of photon pulses and a second different value for the second component for a second pulse of the sequence of photon pulses.

14. A quantum communication method comprising:
    in a sending unit, encoding a sequence of photon pulses with quantum information by setting a single quantum state of a single parameter of each photon pulse of the sequence of photon pulses, said quantum state being set using a combination of a first component and a second component, said first component comprising a randomly selected measurement basis, the second component being determined from information which is pre-shared with the receiving unit, said information being pre-shared before the sequence of photon pulses is sent, said information indicating a first value for the second component for a first pulse of the sequence of photon pulses and a second, different value for the second component for a second pulse of the sequence of photon pulses,
    sending the sequence of encoded photon pulses to a receiving unit comprising a decoder, and
    decoding the said first component of said quantum information by performing a measurement on each photon pulse of the sequence of photon pulses using a measurement basis selected, for each photon pulse of the sequence of photon pulses, using said pre-shared information, to cancel the second component.

15. A method according to claim 14, further comprising sharing secret information between the sending unit and receiving unit concerning the second component.

16. A method according to claim 15, wherein the secret information is a seed key and both the sending unit and the receiving unit expand the seed key.

17. A method according to claim 14, further comprising the receiving unit communicating with the sending unit to disclose what types of measurements were performed on the photons by the receiving unit.

18. A method according to claim 14, wherein the first component is chosen randomly by the sending unit.

19. A method of receiving information from a sending unit, the method comprising:

in a receiving unit, receiving a sequence of photon pulses which has been encoded with quantum information, said quantum information being encoded by setting a quantum state of a single parameter of each photon pulse, said quantum state being set using a combination of a first component and a second component of the single parameter;

receiving pre-shared information from which the second component can be determined from a source using a communication route other than a communication route by which the sequence of photon pulses is received; and decoding said photon pulse by first determining said second component from said pre-shared information and then performing a measurement on said photon pulse using a measurement basis selected to cancel said second component from said photon pulse, wherein the measurement basis is randomly chosen from n measurement basis where n is an integer of at least 2, wherein said pre-shared information indicates a first value for the second component for a first pulse of the sequence of photon pulses and a second, different value for the second component for a second pulse of the sequence of photon pulses.

* * * * *